US010795167B2

(12) United States Patent
Funabiki et al.

(10) Patent No.: US 10,795,167 B2
(45) Date of Patent: Oct. 6, 2020

(54) VIDEO DISPLAY SYSTEM, VIDEO DISPLAY METHOD, NON-TRANSITORY STORAGE MEDIUM, AND MOVING VEHICLE FOR PROJECTING A VIRTUAL IMAGE ONTO A TARGET SPACE

(71) Applicants: PANASONIC INTELLECTUAL PROPERTY MANAGEMENT CO., LTD., Osaka (JP); HONDA MOTOR CO., LTD., Tokyo (JP)

(72) Inventors: Makoto Funabiki, Osaka (JP); Koji Taniguchi, Fukuoka (JP); Hiroaki Okayama, Nara (JP); Masafumi Higashiyama, Saitama (JP); Yosuke Shibazaki, Saitama (JP)

(73) Assignees: PANASONIC INTELLECTUAL PROPERTY MANAGEMENT CO., LTD., Osaka (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/447,450

(22) Filed: Jun. 20, 2019

(65) Prior Publication Data

US 2019/0391401 A1 Dec. 26, 2019

(30) Foreign Application Priority Data

Jun. 21, 2018 (JP) .................................. 2018-117661

(51) Int. Cl.
*G09G 5/00* (2006.01)
*G02B 27/01* (2006.01)

(52) U.S. Cl.
CPC ..... *G02B 27/0179* (2013.01); *G02B 27/0101* (2013.01); *G02B 2027/011* (2013.01);
(Continued)

(58) Field of Classification Search
CPC ............ G02B 27/0179; G02B 27/0101; G02B 2027/011; G02B 2027/014
(Continued)

(56) References Cited

U.S. PATENT DOCUMENTS

2010/0164702 A1* 7/2010 Sasaki ................... G01B 21/22
340/438
2016/0003636 A1* 1/2016 Ng-Thow-Hing ..... H04N 7/188
701/26
(Continued)

FOREIGN PATENT DOCUMENTS

JP 2015-202842 11/2015

*Primary Examiner* — Jonathan M Blancha
(74) *Attorney, Agent, or Firm* — Greenblum & Bernstein, P.L.C.

(57) ABSTRACT

A video display system according to an embodiment includes a display unit, a projection unit, and a display control unit. The display unit displays an image thereon. The projection unit projects a virtual image, corresponding to the image, onto a target space with outgoing light of the display unit. The display control unit performs change processing of changing, in accordance with at least one of a projection distance or an angle of depression, specifics of sway correction for correcting sway of the virtual image with respect to the target space. The projection distance is a distance from a viewpoint of a user, who is viewing the virtual image projected onto the target space, to the virtual image. The angle of depression is an angle from which the virtual image is viewed from the user's viewpoint.

19 Claims, 7 Drawing Sheets

(52) U.S. Cl.
CPC ............... *G02B 2027/014* (2013.01); *G02B 2027/0183* (2013.01); *G02B 2027/0185* (2013.01)

(58) Field of Classification Search
USPC ............................................. 345/7
See application file for complete search history.

(56) References Cited

U.S. PATENT DOCUMENTS

| | | | |
|---|---|---|---|
| 2016/0216521 A1* | 7/2016 | Yachida | G01C 21/365 |
| 2017/0038595 A1 | 2/2017 | Kutomi | |
| 2018/0061134 A1* | 3/2018 | Ota | G08G 1/166 |

* cited by examiner

VIDEO DISPLAY SYSTEM, VIDEO DISPLAY METHOD, NON-TRANSITORY STORAGE MEDIUM, AND MOVING VEHICLE FOR PROJECTING A VIRTUAL IMAGE ONTO A TARGET SPACE

CROSS-REFERENCE TO RELATED APPLICATION

This application claims the benefit of foreign priority to Japanese Patent Application No. 2018-117661 filed on Jun. 21, 2018, which is assigned to the assignee of the present application.

TECHNICAL FIELD

The present disclosure generally relates to a video display system, a video display method, a non-transitory storage medium, and a moving vehicle including the video display system, and more particularly relates to a video display system, a video display method, a non-transitory storage medium, and a moving vehicle including the video display system, all of which are configured or designed to project a virtual image onto a target space.

BACKGROUND ART

A head-up display device (HUD) with the ability to display a virtual image (video information) at a display position suitable to a vehicle condition has been known in the art as an exemplary video display system for projecting a virtual image onto a target space. Such a video display system is disclosed, for example, in JP 2015-202842 A (hereinafter referred to as D1).

A video display system such as the one disclosed in D1 is increasingly required to perform sway correction according to the display mode on a given virtual image.

SUMMARY

The present disclosure provides a video display system, a video display method, a non-transitory storage medium, and a moving vehicle, all of which are configured or designed to be able to perform sway correction according to the display mode on a given virtual image.

A video display system according to an aspect of the present disclosure includes a display unit, a projection unit, and a display control unit. The display unit displays an image thereon. The projection unit projects a virtual image, corresponding to the image, onto a target space with outgoing light of the display unit. The display control unit performs change processing of changing, in accordance with at least one of a projection distance or an angle of depression, specifics of sway correction for correcting sway of the virtual image with respect to the target space. The projection distance is a distance from a viewpoint of a user, who is viewing the virtual image projected onto the target space, to the virtual image. The angle of depression is an angle from which the virtual image is viewed from the user's viewpoint.

A moving vehicle according to another aspect of the present disclosure includes: the video display system described above; and a moving vehicle body in which the video display system is installed.

A video display method according to still another aspect of the present disclosure includes changing, in accordance with at least one of a projection distance or an angle of depression, specifics of sway correction for correcting sway of a virtual image with respect to a target space. The projection distance is a distance from a viewpoint of a user, who is viewing the virtual image projected onto the target space with outgoing light of a display unit, to the virtual image. The angle of depression is an angle from which the virtual image is viewed from the user's viewpoint.

A non-transitory storage medium according to yet another aspect of the present disclosure stores a program that is designed to make a computer system execute the video display method described above.

DESCRIPTION OF EMBODIMENTS (1) Overview

Figure 1:
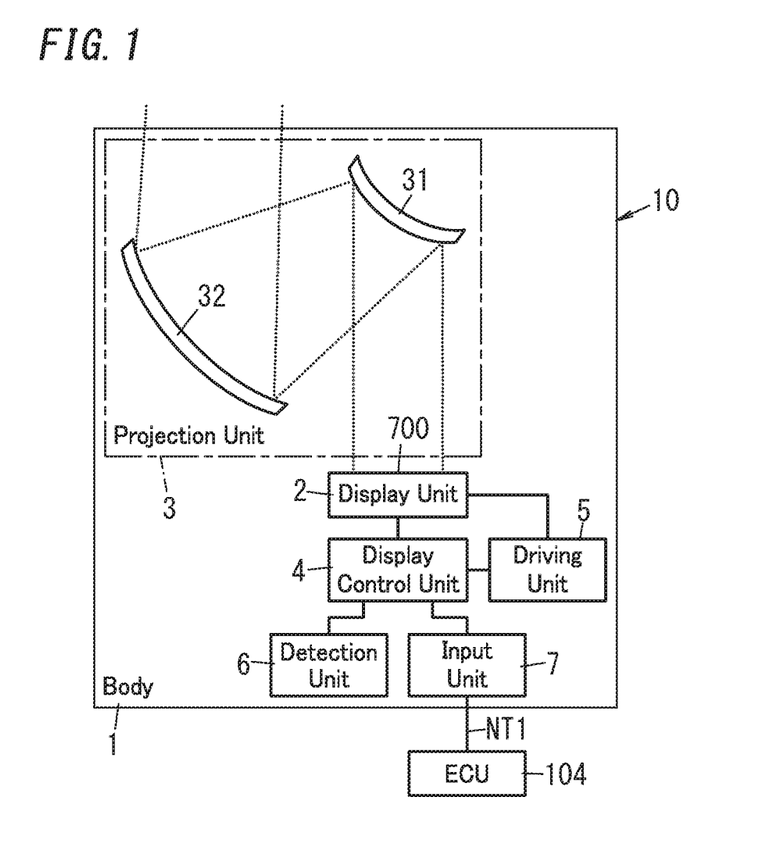
FIG. 1 is a block diagram of a video display system according to an exemplary embodiment.
Figure 2:
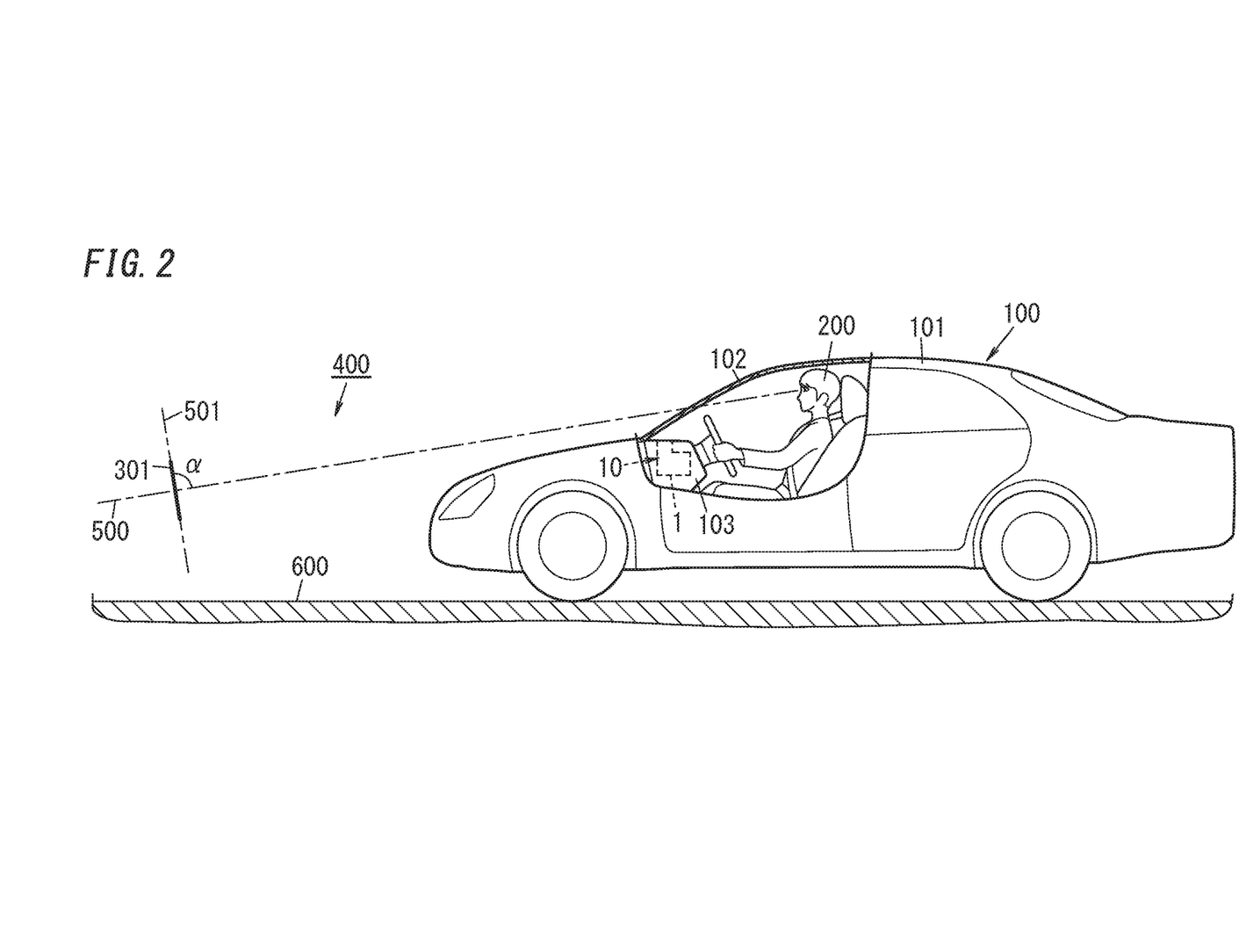
FIG. 2 schematically illustrates a moving vehicle including the video display system.
Figure 4:
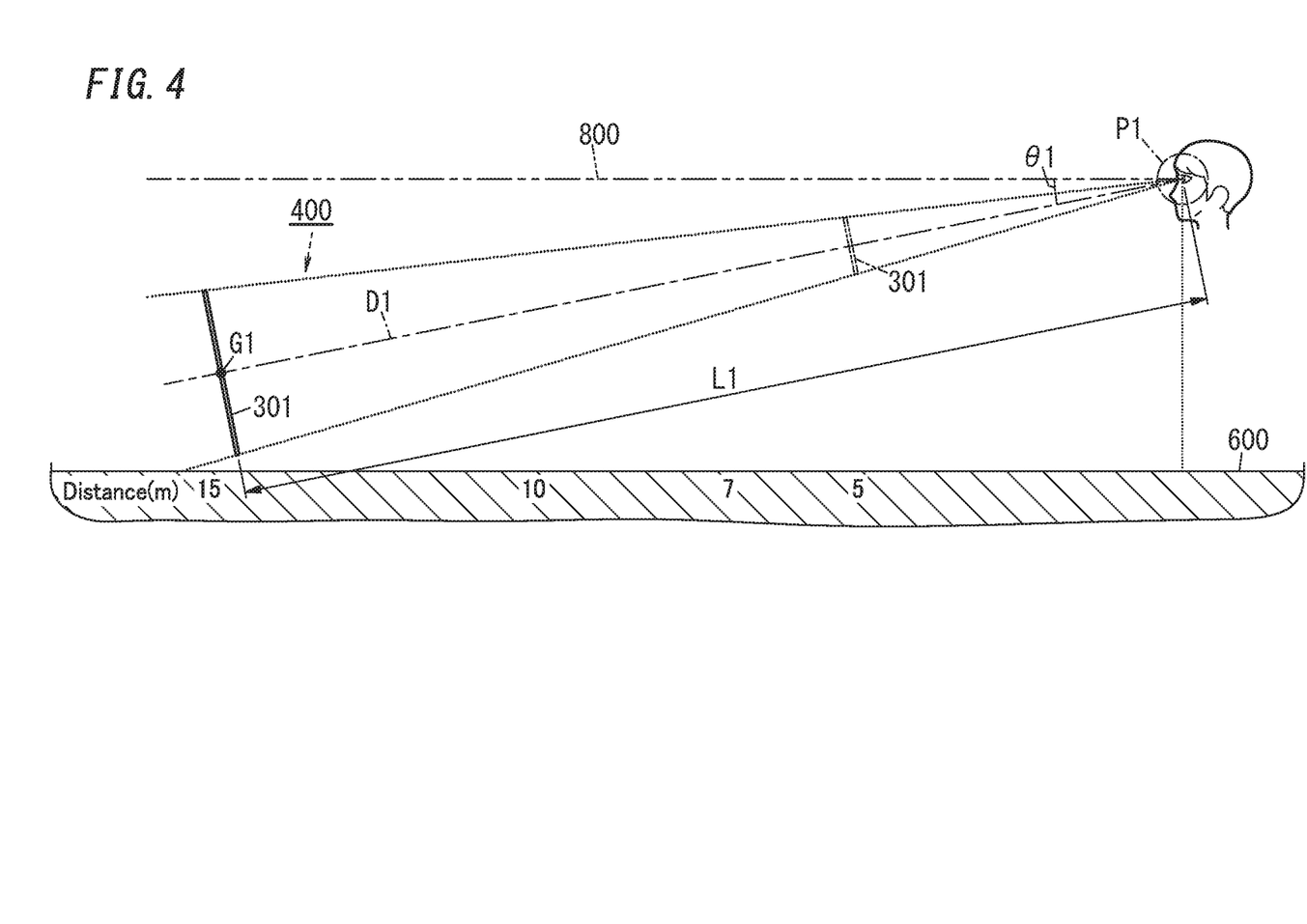
FIG. 4 schematically illustrates a relationship between the user's viewpoint and a virtual image produced when the video display system is used.

A video display system 10 according to this embodiment includes a display unit 2, a projection unit 3, and a display control unit 4 as shown in FIGS. 1 and 2. The display unit 2 displays an image 700 thereon. The projection unit 3 projects a virtual image 301, corresponding to the image 700, onto a target space 400 with outgoing light of the display unit 2. The display control unit 4 performs change processing of changing, in accordance with at least one of a projection distance L1 (see FIG. 4) or an angle of depression θ1 (see FIG. 4), specifics of sway correction for correcting sway of the virtual image 301 with respect to the target space 400. The projection distance L1 is a distance from a viewpoint P1 (see FIG. 4) of a user 200, who is viewing the virtual image 301 projected onto the target space 400, to the virtual image 301. The angle of depression θ1 is an angle from which the virtual image 301 is viewed from the user's 200 viewpoint P1.

The video display system 10 may be mounted, for example, in a moving vehicle body 101 of a moving vehicle 100 such as an automobile (see FIG. 2). The user 200 who is boarding the moving vehicle 100 (such as the driver of the moving vehicle 100) recognizes the virtual image 301 displayed by the video display system 10 as if the virtual image 301 were projected onto the target space 400 that is set in front of the moving vehicle 100. As used herein, the "virtual image" refers to an image formed, as if an object were actually present, on the user's 200 eyes by a reflected light beam, when the light beam emerging from the video display system 10 is reflected from a reflector such as the windshield 102 of the moving vehicle 100 to turn into the reflected light beam. The windshield 102 has a light-transmitting property, which allows the user 200 to view the target space 400 in front of the moving vehicle 100 through the windshield 102. This allows the user 200 to view the virtual image 301 projected by the video display system 10 such that the virtual image 301 is superimposed on his or her view of the real space in front of the moving vehicle 100. Thus, this video display system 10 allows the user 200 to be presented as the virtual image 301 with, and visually recognize, various types of driver assistance information including vehicle velocity information, vehicle condition information, navigation information, pedestrian information, foregoing vehicle information, and lane deviation information. This allows the user 200 to visually acquire the driver assistance information just by shifting his or her gaze only slightly in the state where he or she is watching the real space in front of the windshield 102.

As used herein, the "viewpoint P1" of the user 200 does not have to be a point in the real space but may also be a predetermined range in which the user's 200 eyes are supposed to be located (i.e., a so-called "eye box"). As long as the user's 200 eyes are located within this range (eye box), the user 200 is allowed to view the virtual image 301. In other words, the eye box is the range of viewpoints P1, from any of which the virtual image 301 is viewable and which is set in advance.

Also, as used herein, the "projection distance L1" refers herein to the distance from the user's 200 viewpoint P1 (eye box) to a representative point of the virtual image 301. The representative point of the virtual image 301 is a point of the virtual image 301, to which the user 200 fixes his or her gaze, and may be the center of gravity G1 of the virtual image 301 (see FIG. 4), for example. As used herein, the "angle of depression θ1" refers to the angle defined by the line of the sight direction D1 (see FIG. 4) connecting the user's 200 viewpoint (eye box) P1 to a representative point of the virtual image 301 (such as the center of gravity G1) with respect to a horizontal plane 800 (see FIG. 4) in a situation where the user 200 looks down on the virtual image 301.

The video display system 10 according to this embodiment is allowed to change the display mode of the virtual image 301 by adjusting at least one of the projection distance L1 or the angle of depression θ1. In addition, the display control unit 4 is configured to change, in accordance with at least one of the projection distance L1 or the angle of depression θ1, specifics of the sway correction to be performed on the virtual image 301. Thus, the video display system 10 according to this embodiment is allowed to perform the sway correction on the virtual image 301 according to the display mode. As used herein, the "display mode" refers to how to display the virtual image 301 with respect to the target space 400. Examples of the display mode include the display position of the virtual image 301 with respect to the target space 400 and the size of the virtual image 301. The display mode may be changed by adjusting the projection distance L1, angle of depression θ1, or any other parameter of the virtual image 301.

(2) Details

Next, a video display system 10 according to an exemplary embodiment and a moving vehicle 100 including the video display system 10 will be described in detail with reference to the accompanying drawings.

A video display system 10 according to an exemplary embodiment may be implemented as a head-up display (HUD) to be mounted in a moving vehicle body 101 of a moving vehicle 100 such as an automobile as shown in FIGS. 1 and 2. That is to say, the moving vehicle 100 includes the video display system 10 and a moving vehicle body 100 in which the video display system 10 is installed.

This video display system 10 is installed in the vehicle cabin of the moving vehicle 100 so as to project an image onto the windshield 102 (reflector) of the moving vehicle 100 from under the windshield 102. In the example illustrated in FIG. 2, the video display system 10 is arranged in a dashboard 103 under the windshield 102. When an image 700 (see FIG. 1) is projected onto the windshield 102 from the video display system 10, the user 200 recognizes the image 700 projected onto the windshield 102 as a virtual image 301 displayed in the target space 400 set in front of (and outside of) the moving vehicle 100.

Figure 3:
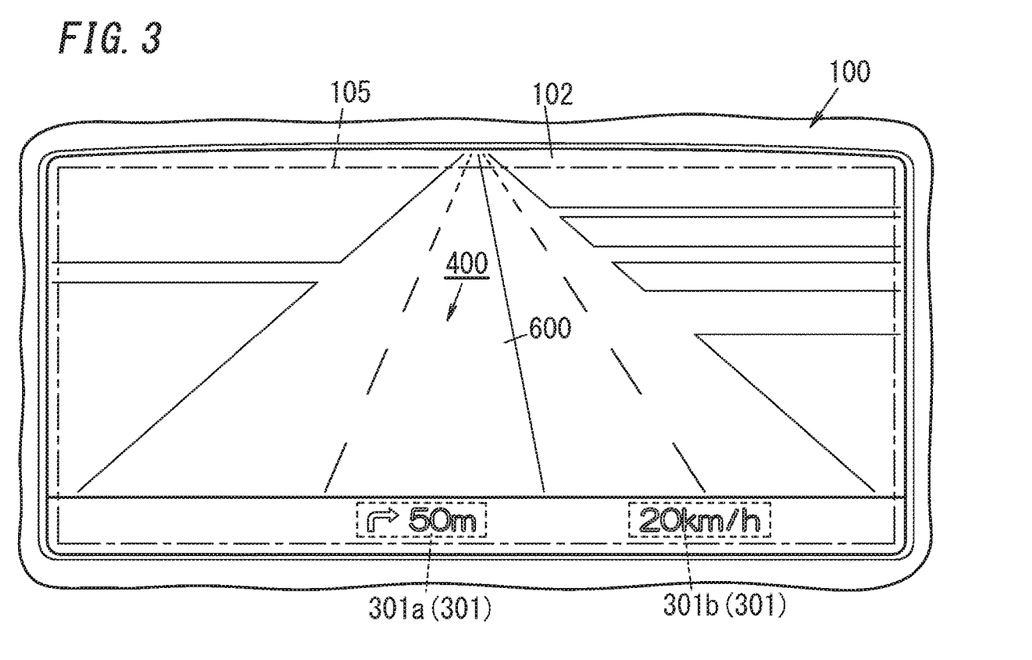
FIG. 3 schematically illustrates how the user's view is like when the video display system is used.

As used herein, the "virtual image" refers to an image formed, as if an object were actually present, on the user's 200 eyes by a reflected light beam, when the light beam emerging from the video display system 10 is reflected from a reflector such as the windshield 102 to turn into the reflected light beam. In other words, the light beam projected by the video display system 10 onto the windshield 102 is reflected from the windshield 102 to form an image on the user's 200 eyes, thus making the user 200 recognize a virtual image that looks, to his or her eyes, as if the virtual image were actually projected at a predetermined projection distance. This allows the user 200 who is boarding the moving vehicle 100 to view the virtual image 301 projected by the video display system 10 such that the virtual image 301 is superimposed on his or her view of the real space in front of the moving vehicle 100 as shown in FIG. 3. Thus, this video display system 10 allows the user 200 to be presented as the virtual image 301 superimposed on his or her view of the real space in front of the moving vehicle 100 with, and visually recognize, various types of driver assistance information. Although the virtual image displayed by the video display system 10 is formed on the user's 200 eyes, the virtual image will be regarded in the following description as being "projected" at the predetermined projection distance by the video display system 10 for the sake of convenience.

In the video display system 10 according to this embodiment, the virtual image 301 formed in the target space 400 includes a first virtual image 301a and a second virtual image 301b, which are displayed on a virtual plane 501. The virtual plane 501 is a virtual plane, of which the tilt angle α with respect to the optical axis 500 of the video display system 10 is larger than a predetermined value γ (i.e., a virtual plane that satisfies α>γ). As used herein, the "optical axis 500" refers to a direction in which the light is incident on the user's 200 eyes (i.e., his or her viewpoint P1) via the projection unit 3. More specifically, the optical axis 500 is a direction in which the light that has emerged from the projection unit 3 and has been reflected from the windshield 102 is incident on the user's 200 eyes (i.e., his or her viewpoint P1), and extends along an optical path that connects the user's 200 eyes (viewpoint P1) and the position of the virtual image 301 together. The optical axis 500 extends, in the target space 400 in front of the moving vehicle 100, along the road surface 600 in front of the moving vehicle 100.

In this example, the predetermined value γ may be 45 degrees, for example, and the tilt angle α may be 90 degrees, for example. That is to say, the virtual plane 501 on which the virtual image 301 is formed is substantially perpendicular to the road surface 600. For example, if the road surface 600 is a horizontal plane, the virtual image 301 is displayed on a vertical plane. Therefore, the virtual image 301 formed on the virtual plane 501 is recognized by the user as being located on a plane that is generally perpendicular to the road surface 600.

The first virtual image 301a may provide, as an exemplary piece of navigation information, distance information indicating the distance to the nearest intersection in the forward direction. The second virtual image 301b may provide, for example, vehicle velocity information indicating the current velocity of the moving vehicle 100. In the example illustrated in FIG. 3, the first virtual image 301a is "50 m" indicating the distance to the nearest intersection, while the second virtual image 301b is "20 km/h" indicating the current vehicle velocity of the moving vehicle 100. The first virtual image 301a and the second virtual image 301b have their projection distance L1 varied according to the velocity of the moving vehicle 100, for example. The display control unit 4 adjusts, according to the velocity of the moving vehicle 100, the projection distances L1 of the first and second virtual images 301a and 301b displayed on the virtual plane 501.

As can be seen, the video display system 10 according to this embodiment is able to display the virtual image 301 on the virtual plane 501. The video display system 10 projects the virtual image 301 such that the virtual image 301 is viewable several to several ten meters (e.g., 3-20 meters) ahead of the moving vehicle 100. In addition, the video display system 10 changes the projection distance L1 of the virtual image 301 such that the higher the velocity of the moving vehicle 100 is, the more distant from the moving vehicle 100 the virtual image 301 is displayed.

Next, the respective constituent elements of the video display system 10 will be described in detail one by one.

As shown in FIG. 1, the video display system 10 according to this embodiment includes a body 1, the display unit 2, the projection unit 3, the display control unit 4, a driving unit 5, a detection unit 6, and an input unit 7.

The body 1 may be implemented as a box made of a synthetic resin, for example. The body 1 may be fixed, for example, in the dashboard 103 of the moving vehicle 100. The body 1 houses the display unit 2, the projection unit 3, the display control unit 4, the driving unit 5, the detection unit 6, and the input unit 7. The body 1 does not have to be implemented as a box but may also be configured as a frame or a plate member as long as the body 1 is able to house the display unit 2, the projection unit 3, the display control unit 4, the driving unit 5, the detection unit 6, and the input unit 7 therein and is attachable to the moving vehicle body 101. The shape of the body 1 may be changed appropriately.

The display unit 2 may be implemented as a liquid crystal display (LCD), for example. The LCD includes a liquid crystal panel and a backlight. The liquid crystal panel is arranged in front of the backlight. The liquid crystal panel displays the image 700 thereon in accordance with a first control signal (image signal) supplied from the display control unit 4. The backlight may be a surface-emitting light source including solid-state light-emitting elements such as light-emitting diodes or laser diodes. The backlight lets the image 700, displayed on the liquid crystal panel, emerge from the front of the liquid crystal panel in accordance with a second control signal supplied from the display control unit 4. The light emerging from the front of the liquid crystal panel is light reflecting the image 700 displayed on the liquid crystal panel and representing the image 700.

The projection unit 3 projects, with the light emerging from the display unit 2 (hereinafter referred to as "outgoing light of the display unit 2"), a virtual image 301, corresponding to the image 700, onto the target space 400. The video display system 10 according to this embodiment is a head-up display, and the projection unit 3 projects the image 700 onto the windshield 102 (see FIG. 2). The projected image 700 is formed in the projection area 105 (see FIG. 3) of the windshield 102.

The projection unit 3 includes a first mirror 31 and a second mirror 32 as shown in FIG. 1. The first mirror 31 and the second mirror 32 are arranged in this order along an optical path leading from the display unit 2 to the viewpoint P1 of the user 200. More specifically, the first mirror 31 is arranged over the display unit 2 such that the outgoing light of the display unit 2 is incident on the first mirror 31. The first mirror 31 reflects the outgoing light of the display unit 2 toward the second mirror 32. The second mirror 32 is positioned to receive the outgoing light, reflected from the first mirror 31, of the display unit 2 (e.g., in front of and under the first mirror 31). The second mirror 32 reflects the outgoing light, already reflected from the first mirror 31, of the display unit 2 upward (i.e., toward the windshield 102). The first mirror 31 may be a convex mirror, and the second mirror 32 may be a concave mirror, for example. However, this is only an example and should not be construed as limiting. The first mirror 31 does not have to be a convex mirror but may also be a plane mirror or even a concave mirror. Likewise, the second mirror 32 does not have to be a concave mirror but may also be a plane mirror or even a convex mirror. In this embodiment, the light projected from the projection unit 3 is reflected by the windshield 102. Alternatively, the light projected from the projection unit 3 may be reflected from a reflective member arranged in an upper part of the dashboard 103 and then allowed to be incident on the user's 200 eyes.

The display control unit 4 controls, in accordance with the result of detection by the detection unit 6 and the input information provided by the input unit 7, the display unit 2 and the driving unit 5. The display control unit 4 is configured to synchronize the operation of the display unit 2 with that of the driving unit 5. The display control unit 4 controls, with a first control signal (image signal), the liquid crystal panel of the display unit 2 to have the image 700 displayed on the liquid crystal panel. In addition, the display control unit 4 also controls, with a second control signal, the backlight of the display unit 2 to have the image 700, displayed on the liquid crystal panel, projected toward the space in front of the liquid crystal panel. Furthermore, the display control unit 4 further controls, with a third control signal, the driving unit 5 to shift the display unit 2.

The display control unit 4 may be implemented, for example, as a microcomputer including a processor and a memory. That is to say, the display control unit 4 is implemented as a computer system including a processor and a memory. In other words, the computer system performs the function of the display control unit 4 by making the processor execute an appropriate program. The program may be stored in advance in either the memory or may also be downloaded via a telecommunications line such as the Internet or distributed after having been stored on a non-transitory storage medium such as a memory card.

The driving unit 5 shifts the display unit 2 so as to change the projection distance L1 from the user's 200 viewpoint (eye box) P1 to the virtual image 301 projected onto the target space 400. The projection distance L1 varies according to the length of the optical path leading from the display unit 2 to the user's 200 eyes (viewpoint P1) via the projection unit 3. That is to say, the longer the optical path length is, the longer the projection distance L1 is. The driving unit 5 shifts the display unit 2 such that the length of the optical path leading from the display unit 2 to the user's 200 eyes (viewpoint P1) via the projection unit 3 becomes a distance specified by the third control signal supplied from the display control unit 4. The driving unit 5 may include an electrical actuator such as a voice coil motor, and operate in accordance with the third control signal supplied from the display control unit 4.

The detection unit 6 may be implemented as, for example, a triaxial gyrosensor. The triaxial gyrosensor is a sensor for detecting any change in the orientation of the body 1 and may detect the pitch angle, yaw angle, and roll angle of the body 1, for example. In this embodiment, the body 1 is fixed in the dashboard 103 of the moving vehicle 100, and therefore, a change in the orientation of the body 1 means a change in the orientation of the moving vehicle 100. Thus, the detection unit 6 is allowed to detect a change in the orientation of the moving vehicle 100 by detecting any change in the orientation of the body 1. The detection unit 6 outputs information about the change thus detected in the orientation of the body 1 (or the moving vehicle 100) as correspondence information to the display control unit 4. As used herein, the "correspondence information" is information corresponding to road type information and may provide information about any change in the orientation of the moving vehicle 100 (such as a pitch angle, a yaw angle, or a roll angle). The "road type information" is information about the road along which the moving vehicle 100 is traveling and may provide information about the type or attribute of the road (e.g., a bad road or road with a series of curves). The detection unit 6 detects the correspondence information in this embodiment but may also detect the road type information. That is to say, the result of detection by the detection unit 6 may be either the correspondence information or the road type information. In other words, the detection unit 6 outputs either road type information about the road along which the moving vehicle 100 is traveling or correspondence information corresponding to the road type information.

The input unit 7 acquires moving vehicle information about the moving vehicle 100 either at regular intervals or at irregular intervals from an electronic control unit (ECU) 104 over a controller area network (CAN) NT1, for example. The moving vehicle information may be, for example, velocity information about the velocity of the moving vehicle 100. The input unit 7 outputs the moving vehicle information (velocity information), provided by the ECU 104, to the display control unit 4. Note that the ECU 104 controls a drive system, a steering system, and other systems of the moving vehicle 100 in accordance with the user's 200 command accepted by a human interface. Alternatively, the ECU 104 may also control the drive system, the steering system, and other systems of the moving vehicle 100 in accordance with a control instruction given by an advanced driver assistance system (ADAS).

The video display system 10 according to this embodiment is mounted in the moving vehicle body of the moving vehicle 100. Therefore, depending on the type or condition of the road along which the moving vehicle 100 is traveling, sway of the moving vehicle 100 may cause sway of the virtual image 301 with respect to the target space 400, thus possibly making it difficult for the user 200 boarding the moving vehicle 100 to view the virtual image 301. Thus, to increase the viewability of the virtual image 301, the display control unit 4 according to this embodiment is configured to perform sway correction on the virtual image 301. As used herein, the "sway correction" refers to reducing the sway of the virtual image 301 with respect to the target space 400. Specifically, the display control unit 4 shifts the image 700 displayed on the display unit 2 in the opposite direction from the sway direction of the moving vehicle 100 synchronously with the sway of the moving vehicle 100. In this case, the longer the projection distance L1 of the virtual image 301 is, the greater the amplitude of the sway of the virtual image 301 becomes. Thus, the display control unit 4 is suitably configured to enhance the strength of the sway correction as the projection distance L1 is extended. As used herein, the "strength of sway correction" refers to the magnitude of displacement of the image 700 in order to cancel the sway of the moving vehicle 100. The higher the strength of the sway correction is, the greater the magnitude of displacement of the image 700 is.

The display control unit 4 is also configured to perform change processing of changing the specifics of the sway correction in accordance with at least one of the projection distance L1 or the angle of depression θ1. In this case, depending on the length of the projection distance L1, the sway of the virtual image 301 may be too little to require the sway correction. Thus, the "change processing" as used herein includes processing of changing the specifics of the sway correction itself (such as the magnitude of displacement of the image 700) and processing of determining whether or not to perform the sway correction at all.

Also, in a situation where the projection distance L1 to the virtual image 301 is constant, the sway of the virtual image 301 could increase depending on the type or condition of the road along which the moving vehicle 100 is traveling. Thus, the display control unit 4 is suitably configured to restrict the projection distance L1 according to the type or condition of the road. In other words, the display control unit 4 suitably restricts the projection distance L1 in accordance with either the road type information about the road along which the moving vehicle 100 is traveling or the correspondence information corresponding to the road type information. That is to say, the display control unit 4 is suitably configured to vary the projection distance L1 according to the moving vehicle information (including velocity information and road type information) about the moving vehicle 100. The display control unit 4 more suitably shortens, in accordance with the result of detection by the detection unit 6 (i.e., in accordance with the road type information or correspondence information), the projection distance L1 as the magnitude of the swaying motion of the moving vehicle 100 increases. This is because the greater the magnitude of the sway (swaying motion) of the moving vehicle 100 is, the greater the magnitude of sway of the virtual image 301 becomes. This configuration reduces the sway of the virtual image 301, and thereby improves the viewability of the virtual image 301, compared with a situation where the projection distance L1 is not limited. In this embodiment, the display control unit 4 restricts the upper limit value of the projection distance L1 to a first limit value according to the type or condition of the road along which the moving vehicle 100 is traveling. The first limit value may be any arbitrary value as long as the first limit value is less than the projection distance L1 set by the display control unit 4 based on only the velocity of the moving vehicle 100.

Figure 5:
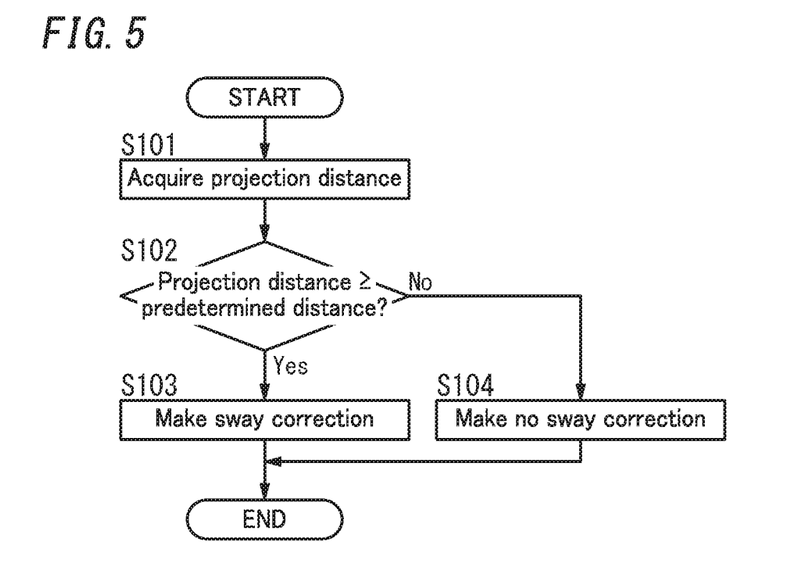
FIG. 5 is a flowchart showing a procedure in which the video display system operates when performing change processing.
Figure 6:
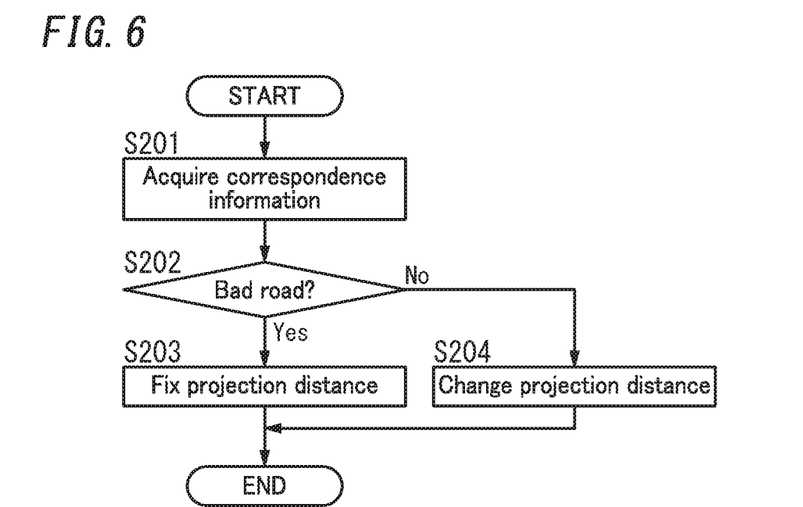
FIG. 6 is a flowchart showing a procedure in which the video display system operates when setting a projection distance.
Figure 7:
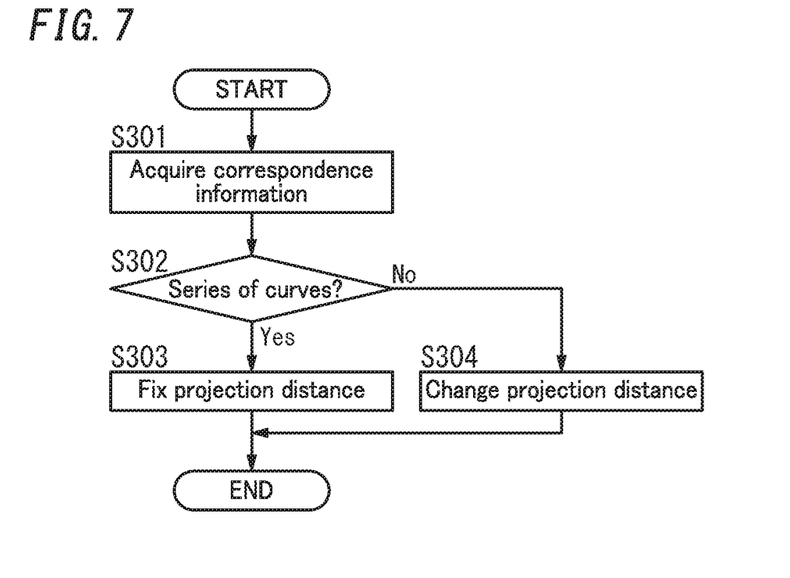
FIG. 7 is a flowchart showing another procedure in which the video display system operates when setting the projection distance.

(3) Operation Next, it will be described with reference to FIGS. 5-7 how the video display system 10 according to this embodiment operates.

(3.1) Change Processing

First of all, it will be described with reference to FIG. 5 how the display control unit 4 performs the change processing. In the following description, the processing of determining, according to the length of the projection distance L1 of the virtual image 301, whether or not to perform sway correction on the virtual image 301 will be described as an exemplary type of change processing.

The display control unit 4 acquires, in accordance with the moving vehicle 100 velocity information provided by the ECU 104 via of the input unit 7, a projection distance L1 corresponding to the velocity information (in Step S101). The display control unit 4 compares the projection distance L1 thus acquired with a predetermined distance (in Step S102). As used herein, the "predetermined distance" refers to the maximum value of the distance at which the virtual image 301 appears, when viewed from the user 200, to overlap with the hood of the moving vehicle 100. For example, the "predetermined distance" may be a distance of up to 4 meters from the front end of the hood of the moving vehicle 100. The "predetermined distance" varies according to the structure of the moving vehicle 100, the height level of the user's 200 viewpoint P1 (eye box), or any other parameter, for example.

When finding the projection distance L1 equal to or longer than the predetermined distance (i.e., if the answer is YES in Step S102), the display control unit 4 determines that the sway correction should to be performed because the sway of the virtual image 301 with respect to the target space 400 has relatively large amplitude, and does perform the sway correction on the virtual image 301 (in Step S103). On the other hand, when finding the projection distance L1 shorter than the predetermined distance (i.e., if the answer is NO in Step S102), the display control unit 4 determines that no sway correction should be performed because the sway of the virtual image 301 has relatively small amplitude, and performs no sway correction on the virtual image 301 (in Step S104). That is to say, while performing the change processing, the display control unit 4 performs the sway correction when finding the projection distance L1 equal to or longer than the predetermined distance, but does not perform the sway correction when finding the projection distance L1 shorter than the predetermined distance.

As can be seen, performing the sway correction when finding the projection distance L1 equal to or longer than the predetermined distance allows the sway of the virtual image 301 to be reduced and makes the virtual image 301 more easily viewable for the user 200. In addition, performing no sway correction when finding the projection distance L1 shorter than the predetermined distance curbs the decline in viewability for the user 200 while lightening the processing load on the display control unit 4.

(3.2) Setting Processing

Next, it will be described with reference to FIGS. 6 and 7 how the display control unit 4 performs setting processing of setting the projection distance L1.

First of all, it will be described with reference to FIG. 6 how the display control unit 4 sets the projection distance L1 according to the road surface condition.

The display control unit 4 acquires correspondence information from the detection unit 6 (in Step S201). Specifically, the display control unit 4 acquires information about the pitch angle, yaw angle, and roll angle of the moving vehicle 100 from the detection unit 6. The display control unit 4 determines, based on the magnitude of variation in at least one of the pitch angle or yaw angle of the moving vehicle 100, the road surface condition of the road along which the moving vehicle 100 is traveling, i.e., whether or not the road is a bad road (in Step S202). Specifically, when finding the magnitude of variation in at least one of the pitch angle or roll angle of the moving vehicle 100 equal to or greater than a first angle, the display control unit 4 determines that the road should be a bad road. On the other hand, when finding the magnitudes of variation in the pitch angle and roll angle of the moving vehicle 100 less than the first angle, the display control unit 4 determines that the road should not be a bad road. When finding the moving vehicle 100 traveling along a bad road (i.e., if the answer is YES in Step S202), the display control unit 4 fixes (restricts) the projection distance L1 at a first limit value (in Step S203). On the other hand, when finding the moving vehicle 100 not traveling along a bad road (i.e., if the answer is NO in Step S202), the display control unit 4 changes the projection distance L1 in accordance with the velocity information provided by the ECU 104 (in Step S204). In this embodiment, the display control unit 4 determines the road surface condition based on both the pitch angle and roll angle of the moving vehicle 100. However, this is only an example and should not be construed as limiting. Alternatively, the display control unit 4 may also determine the road surface condition based on at least one of the pitch angle or the roll angle.

Fixing (or restricting) the projection distance L1 at the first limit value as described above when finding the moving vehicle 100 traveling along a bad road reduces the sway of the virtual image 301 with respect to the target space 400, compared with changing the projection distance L1 according to the velocity of the moving vehicle 100. This makes the virtual image 301 more easily viewable for the user 200.

Next, it will be described with reference to FIG. 7 how the display control unit 4 sets the projection distance L1 according to the road shape.

The display control unit 4 acquires correspondence information from the detection unit 6 (in Step S301). Specifically, the display control unit 4 acquires information about the pitch angle, yaw angle, and roll angle of the moving vehicle 100 from the detection unit 6. The display control unit 4 determines, based on the magnitude of variation in at least one of the yaw angle or roll angle of the moving vehicle 100 through a certain period, whether or not the shape of the road along which the moving vehicle 100 is traveling is a series of curves (in Step S302). As used herein, the "certain period" may be, for example, the amount of time it would take for the moving vehicle 100 to pass through a series of two curves. Specifically, when finding the magnitude of variation in at least one of the yaw angle or roll angle of the moving vehicle 100 through the certain period equal to or greater than a second angle, the display control unit 4 determines that the road should be a series of curves. On the other hand, when finding the magnitudes of variation in the yaw angle and roll angle of the moving vehicle 100 through the certain period less than the second angle, the display control unit 4 determines that the road should not be a series of curves. When finding the moving vehicle 100 traveling through the series of curves (i.e., if the answer is YES in Step S302), the display control unit 4 fixes (restricts) the projection distance L1 at a first limit value (in Step S303). On the other hand, when finding the moving vehicle 100 not traveling through a series of curves (i.e., if the answer is NO in Step S302), the display control unit 4 changes the projection distance L1 in accordance with the velocity information provided by the ECU 104 (in Step S304). In this embodiment, the display control unit 4 determines the road shape based on both the yaw angle and roll angle of the moving vehicle 100. However, this is only an example and should not be construed as limiting. Alternatively, the display control unit 4 may also determine the road shape based on at least one of the yaw angle or the roll angle.

According to this configuration, while the moving vehicle 100 is traveling through a series of curves like when passing through a mountain trail, the projection distance L1 is fixed at the first limit value and does not vary according to the velocity of the moving vehicle 100. This makes the virtual image 301 easily viewable for the user 200.

In general, if the velocity of the moving vehicle 100 varies significantly, the user's 200 viewpoint P1 is located close enough to the moving vehicle 100. Thus, the display control unit 4 is suitably configured to shorten the projection distance L1 of the virtual image 301 in such a situation. That is to say, the display control unit 4 is suitably configured to shorten the projection distance L1 as the velocity of the moving vehicle 100 varies more and more significantly. This configuration curbs a decline in the viewability of the virtual image 301 even when the moving vehicle 100 is traveling through a series of curves like when passing through a mountain trail, for example.

(4) Variations

The embodiment described above is only one of various embodiments of the present disclosure, and may be readily modified, changed, replaced, or combined with any other embodiments, depending on a design choice or any other factor, without departing from a true spirit and scope of the present disclosure. Also, the same function as that of the video display system 10 may be implemented as a video display method, a computer program, or a non-transitory storage medium that stores the computer program thereon, for example.

A video display method according to an aspect includes changing, in accordance with at least one of a projection distance L1 or an angle of depression θ1, specifics of sway correction for correcting sway of a virtual image 301 with respect to a target space 400. The projection distance L1 is a distance from a viewpoint P1 of a user 200, who is viewing the virtual image 301 projected onto the target space 400 with outgoing light of a display unit 2, to the virtual image 301. The angle of depression θ1 is an angle from which the virtual image 301 is viewed from the user's 200 viewpoint P1.

A non-transitory storage medium according to another aspect stores a program that is designed to make a computer system execute the video display method described above.

Next, variations of the embodiment described above will be enumerated one after another. Note that any of the variations to be described below may be combined as appropriate.

The agent that carries out the functions of the video display system 10 or the video display method according to the present disclosure includes a computer system. In that case, the computer system may include, as principal hardware components, a processor and a memory. The functions of the video display system 10 or the agent that carries out the video display method according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). As used herein, the "integrated circuit" such as an IC or an LSI is called by a different name depending on the degree of integration thereof. Examples of the integrated circuits include a system LSI, a very largescale integrated circuit (VLSI), and an ultra largescale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips without limitation. Those multiple chips may be integrated together in a single device or distributed in multiple devices without limitation.

Also, in the embodiment described above, the video display system 10 is implemented as a single device with various functions thereof implemented in a single housing (body 1). However, this is only an example and should not be construed as limiting. Alternatively, those functions of the video display system 10, namely, the functions of the display unit 2, the projection unit 3, and the display control unit 4, may be distributed in multiple different devices. Still alternatively, the function of at least one of the display unit 2, the projection unit 3, or the display control unit 4, may be distributed in two or more different devices. Optionally, the display control unit 4 may be implemented as a cloud computing system as well.

(4.1) First Variation

Figure 8:
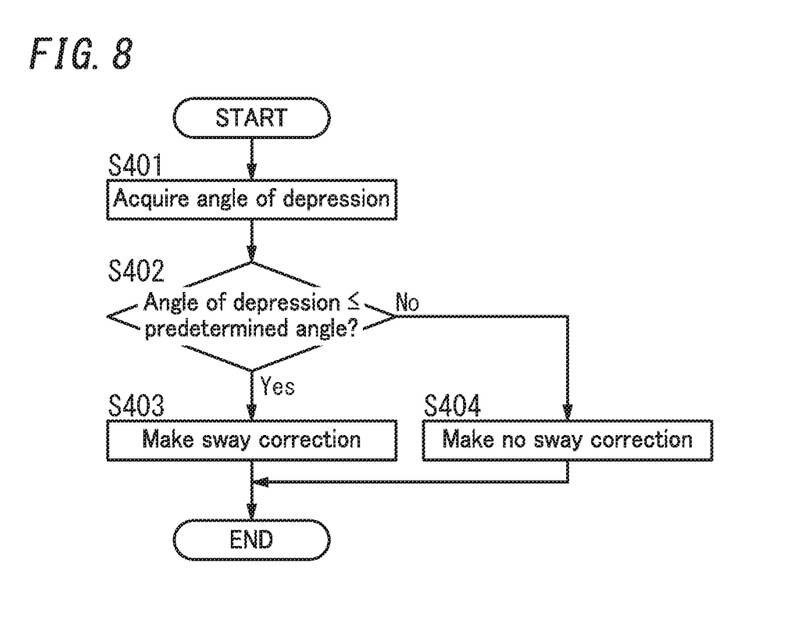
FIG. 8 is a flowchart showing a procedure in which a video display system according to a first variation of the exemplary embodiment operates when performing the change processing.

In the embodiment described above, while performing the change processing, the display control unit 4 determines, by the length of the projection distance L1 of the virtual image 301, whether or not to perform the sway correction on the virtual image 301. However, this is only an example and should not be construed as limiting. Alternatively, the display control unit 4 may also determine, by the magnitude of the angle of depression θ1 from which the user 200 views the virtual image 301 as shown in FIG. 8, whether or not to perform the sway correction on the virtual image 301. Next, it will be described with reference to FIG. 8 how the display control unit 4 of the video display system 10 according to the first variation operates. Note that the video display system 10 according to the first variation has the same configuration as the video display system 10 according to the exemplary embodiment. Thus, each constituent element of this variation having the same function as a counterpart of the embodiment described above will be designated by the same reference numeral as that counterpart's, and a detailed description thereof will be omitted herein.

In this variation, the driver's seat of the moving vehicle 100 is provided with an operating unit for adjusting the angle of depression θ1. The user uses this operating unit to enter angle of depression information about the angle of depression θ1 into the display control unit 4.

The display control unit 4 acquires the angle of depression information, entered by the user 200, from the operating unit (in Step S401). The display control unit 4 compares the angle of depression θ1 included in the angle of depression information with a predetermined angle (in Step S402). As used herein, the "predetermined angle" is an angle from which the virtual image 301 is viewable for the user 200 while reducing the chances of the virtual image 301 looking as if the virtual image 301 penetrated into the hood of the moving vehicle 100. The predetermined angle may be, for example, an angle at which the virtual image 301 is displayed with the lower end thereof displayed at a level higher by approximately one degree than the front end of the hood of the moving vehicle 100. The "predetermined angle" varies according to the structure of the moving vehicle 100, the height level of the viewpoint P1 (eye box) of the user 200, or any other parameter.

When finding the angle of depression $\theta 1$ equal to or smaller than the predetermined angle (i.e., if the answer is YES in Step S402), the display control unit 4 determines that the sway correction should be performed, because the sway of the virtual image 301 with respect to the target space 400 is relatively significant, and does perform the sway correction on the virtual image 301 (in Step S403). The reason is that as the angle of depression $\theta 1$ decreases (i.e., as the display level of the virtual image 301 rises), the virtual image 301 distances itself from the hood of the moving vehicle 100, thus making the relative positional shift (sway) between the virtual image 301 and the background (i.e., the target space 400) more and more noticeable for the user 200. On the other hand, when finding the angle of depression $\theta 1$ larger than the predetermined angle (i.e., if the answer is NO in Step S402), the display control unit 4 determines that no sway correction should be performed, because the sway of the virtual image 301 with respect to the target space 400 is relatively insignificant, and does not perform the sway correction on the virtual image 301 (in Step S404). The reason is that as the angle of depression $\theta 1$ increases (i.e., as the display level of the virtual image 301 falls), the virtual image 301 comes closer toward the hood of the moving vehicle 100, thus making the relative positional shift between the virtual image 301 and the background less noticeable for the user 200. That is to say, while performing the change processing, the display control unit 4 performs the sway correction when finding the angle of depression $\theta 1$ equal to or smaller than the predetermined angle and does not perform the sway correction when finding the angle of depression $\theta 1$ larger than the predetermined angle.

As can be seen, performing the sway correction when finding the angle of depression $\theta 1$ equal to or smaller than the predetermined angle reduces the sway of the virtual image 301 and makes the virtual image 301 more easily viewable for the user 200. In addition, performing no sway correction when finding the angle of depression $\theta 1$ larger than the predetermined angle curbs the decline in viewability for the user 200 while lightening the processing load on the display control unit 4.

In addition, as the angle of depression $\theta 1$ decreases (i.e., as the display level of the virtual image 301 rises), the virtual image 301 distances itself from the moving vehicle 100, thus making the relative positional shift between the virtual image 301 and the background (i.e., the target space 400) more and more noticeable for the user 200. Therefore, to reduce the sway of the virtual image 301 with respect to the target space 400, the display control unit 4 is suitably configured to enhance the strength of the sway correction as the angle of depression $\theta 1$ decreases. This reduces the sway of the virtual image 301 with respect to the target space 400, thus making the virtual image 301 more easily viewable for the user 200.

(4.2) Second Variation

In the embodiment described above, while performing the change processing, the display control unit 4 determines, by the length of the projection distance L1 of the virtual image 301, whether or not to perform the sway correction on the virtual image 301. However, this is only an example and should not be construed as limiting. Alternatively, the display control unit 4 may be configured to perform the change processing according to the velocity of the moving vehicle 100 as well. Next, it will be described with reference to FIG. 9 how the display control unit 4 of the video display system 10 according to the second variation operates. Note that the video display system 10 according to the second variation has the same configuration as the video display system 10 according to the exemplary embodiment. Thus, each constituent element of this variation having the same function as a counterpart of the embodiment described above will be designated by the same reference numeral as that counterpart's, and a detailed description thereof will be omitted herein.

Figure 9:
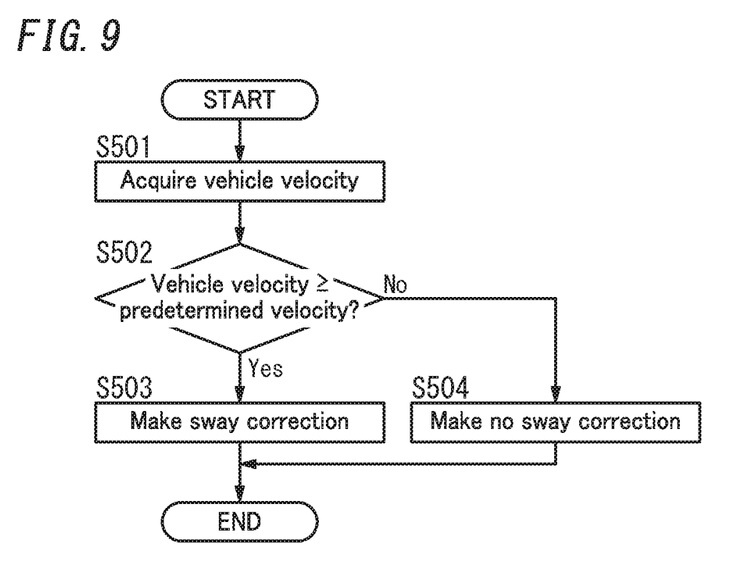
FIG. 9 is a flowchart showing a procedure in which a video display system according to a second variation of the exemplary embodiment operates when performing the change processing.

The display control unit 4 acquires the velocity information of the moving vehicle 100 from the ECU 104 via the input unit 7 (in Step S501). Then, the display control unit 4 compares the velocity thus acquired of the moving vehicle 100 with a predetermined velocity (in Step S502). The predetermined velocity may be set as appropriate according to the performance of the moving vehicle 100, for example.

When finding the velocity of the moving vehicle 100 equal to or higher than the predetermined velocity (i.e., if the answer is YES in Step S502), the display control unit 4 determines that the sway correction should be performed, because the sway of the virtual image 301 with respect to the target space 400 is relatively significant, and does perform the sway correction on the virtual image 301 (in Step S503). On the other hand, when finding the velocity of the moving vehicle 100 lower than the predetermined velocity (i.e., if the answer is NO in Step S502), the display control unit 4 determines that no sway correction should be performed, because the sway of the virtual image 301 with respect to the target space 400 is relatively insignificant, and does not perform the sway correction on the virtual image 301 (in Step S504). That is to say, the display control unit 4 performs the change processing according to the velocity of the moving vehicle 100 as well. In other words, while performing the change processing, the display control unit 4 determines, according to the velocity of the moving vehicle 100, whether or not to perform the sway correction on the virtual image 301.

As can be seen, performing the sway correction when finding the velocity of the moving vehicle 100 equal to or higher than the predetermined velocity reduces the sway of the virtual image 301 and makes the virtual image 301 more easily viewable for the user 200. In addition, performing no sway correction when finding the velocity of the moving vehicle 100 lower than the predetermined velocity curbs the decline in viewability for the user 200 while lightening the processing load on the display control unit 4.

(4.3) Other Variations

Next, other variations will be described.

In the exemplary embodiment described above, the display unit 2 is implemented as a display device such as a liquid crystal display (LCD). However, this is only an example and should not be construed as limiting. Alternatively, the display unit 2 may also be implemented as a different type of display device such as an organic electroluminescent (OEL) display device, instead of an LCD. In addition, the display unit 2 does not have to be a display device such as an LCD, but may also include a projector for projecting light onto a screen. In that case, the projector may be implemented as either a rear projector for displaying an image on the surface of a screen by projecting light from behind the screen or a front projector for displaying an image on the surface of a screen by projecting light from the front of the screen. Alternatively, the projector may also be a scanning projector for producing an image on a screen by scanning the object with light (such as a laser beam) emitted from behind or the front of the screen.

Also, in the exemplary embodiment described above, the projection unit 3 includes two mirrors (namely, the first mirror 31 and the second mirror 32) as optical members for making the outgoing light of the display unit 2 incident on the user's 200 eyes. However, this is only an example and should not be construed as limiting. The projection unit 3 does not have to include the mirrors. Alternatively, the projection unit 3 may include at least one of a mirror or a lens as at least one optical member. That is to say, the number of the at least one optical member that is at least one of a mirror or a lens may be either single or plural.

Furthermore, in the exemplary embodiment described above, the driving unit 5 shifts the display unit 2 in accordance with the third control signal supplied from the display control unit 4 to change the projection distance L1 of the virtual image 301. However, the display unit 2 does not have to be shifted to change the projection distance L1 of the virtual image 301. Alternatively, the projection distance L1 of the virtual image 301 may also be changed by shifting at least one of the first mirror 31 or the second mirror 32 of the projection unit 3 in accordance with the third control signal supplied from the display control unit 4. Still alternatively, if the projection unit 3 includes a lens as an optical member, the projection distance L1 of the virtual image 301 may be changed by making the driving unit 5 shift the lens in accordance with the third control signal supplied from the display control unit 4. Yet alternatively, if the projection unit 3 includes a lens such as a liquid crystal lens as an optical member, the projection distance L1 of the virtual image 301 may be changed by making the driving unit 5 adjust the focal length of the liquid crystal lens with the voltage applied to the liquid crystal lens varied.

Furthermore, in the embodiment described above, the detection unit 6 is implemented as a triaxial gyrosensor. However, the detection unit 6 does not have to be the triaxial gyrosensor but may also be any other type of sensor or even a camera, as long as the detection unit 6 is able to detect a change in the orientation of the moving vehicle 100 or a road type. For example, if the detection unit 6 is implemented as a camera, then the display control unit 4 may determine the road type based on the image data provided by the camera (more specifically, based on the magnitude of variation of a feature point in the image).

Alternatively, the display control unit 4 may acquire map information and location information about the moving vehicle 100 from the ECU 104 via the input unit 7 and determine, based on these pieces of information, what road and what type of road the moving vehicle 100 is now traveling along. In that case, the road type may be included in advance in the map information, acquired by the ECU 104 from an external server by communicating with the external server, or retrieved from the past traveling history of the moving vehicle 100. Alternatively, if the detection unit 6 is a camera, the display control unit 4 may also determine the road type based on the road signs shot in the image data provided by the camera.

Furthermore, in the embodiment described above, the angle of depression $\theta 1$ from which the user 200 views the virtual image 301 is changed by shifting the location of the image 700 on the display unit 2. However, this is only an example and should not be construed as limiting. Alternatively, the angle of depression $\theta 1$ may also be changed by adjusting the angle of at least one of the first mirror 31 or the second mirror 32. Still alternatively, if the projection unit 3 includes a lens as an optical member, then the angle of depression $\theta 1$ may also be changed by adjusting the angle of the lens.

Furthermore, in the embodiment described above, the display control unit 4 restricts (or fixes), in accordance with the road type information (correspondence information) about the road along which the moving vehicle 100 is now traveling, the projection distance L1 to the first limit value. However, this is only an example and should not be construed as limiting.

Alternatively, the display control unit 4 may also restrict (or fix), in accordance with the road type information (correspondence information), the upper limit value of the variation range of the projection distance L1 to a second limit value. The second limit value may be any arbitrary value as long as the second limit value is smaller than the upper limit value of the projection distance L1 variation range set by the display control unit 4 based on only the velocity of the moving vehicle 100.

Furthermore, in the embodiment described above, the video display system 10 is implemented as a head-up display. However, this is only an example and should not be construed as limiting. Alternatively, the video display system 10 may also be implemented as a head mounted display (HMD) designed to be worn by the user 200 over his or her head.

Furthermore, in the embodiment described above, the virtual image 301 is displayed on the virtual plane 501 that is generally perpendicular to the road surface 600. However, this is only an example and should not be construed as limiting. Alternatively, the virtual image may also be displayed (superimposed) on a virtual plane that is generally parallel to the road surface 600.

Furthermore, in the foregoing description of embodiments, if one of two values being compared with each other (such as the lengths L1 of the projection distances or the magnitudes of the angles of depression $\theta 1$) is "equal to or greater than" the other, this phrase may herein cover both a situation where these two values are equal to each other and a situation where one of the two values is greater than the other. However, this should not be construed as limiting. Alternatively, the phrase "equal to or greater than" may also be a synonym of the phrase "greater than" that covers only a situation where one of the two values is over the other. That is to say, it is arbitrarily changeable, depending on selection of a reference value or any preset value, whether or not the phrase "equal to or greater than" covers the situation where the two values are equal to each other. Therefore, from a technical point of view, there is no difference between the phrase "equal to or greater than" and the phrase "greater than." Similarly, the phrase "equal to or less than" may be a synonym of the phrase "less than" as well.

(Resume)

As can be seen from the foregoing description, a video display system (10) according to a first aspect includes a display unit (2), a projection unit (3), and a display control unit (4). The display unit (2) displays an image (700) thereon. The projection unit (3) projects a virtual image (301), corresponding to the image (700), onto a target space (400) with outgoing light of the display unit (2). The display control unit (4) performs change processing of changing, in accordance with at least one of a projection distance (L1) or an angle of depression ($\theta 1$), specifics of sway correction for correcting sway of the virtual image (301) with respect to the target space (400). The projection distance (L1) is a distance from a viewpoint (P1) of a user (200), who is viewing the virtual image (301) projected onto the target space (400), to the virtual image (301). The angle of depression (θ1) is an angle from which the virtual image (301) is viewed from the user (200)'s viewpoint (P1).

According to this aspect, the display control unit (4) is configured to change, in accordance with at least one of the projection distance (L1) or the angle of depression (θ1), specifics of sway correction to be performed on the virtual image (301). This allows the sway correction to be performed on the virtual image (301) according to the display mode.

In a video display system (10) according to a second aspect, which may be implemented in conjunction with the first aspect, during the change processing, the display control unit (4) performs the sway correction when finding the projection distance (L1) equal to or longer than a predetermined distance, and performs no sway correction when finding the projection distance (L1) shorter than the predetermined distance.

This aspect allows the sway of the virtual image (301) to be reduced irrespective of the length of the projection distance (L1).

In a video display system (10) according to a third aspect, which may be implemented in conjunction with the first or second aspect, during the change processing, the display control unit (4) enhances strength of the sway correction as the projection distance (L1) increases.

This aspect allows the sway of the virtual image (301) to be reduced, irrespective of the length of the projection distance (L1), by enhancing the strength of the sway correction as the projection distance (L1) increases. This is because the magnitude of sway of the virtual image (301) increases as the projection distance (L1) increases.

In a video display system (10) according to a fourth aspect, which may be implemented in conjunction with the first aspect, during the change processing, the display control unit (4) performs the sway correction when finding the angle of depression (θ1) equal to or smaller than a predetermined angle, and performs no sway correction when finding the angle of depression (θ1) larger than the predetermined angle.

This aspect allows the sway of the virtual image (301) to be reduced irrespective of the magnitude of the angle of depression (θ1).

In a video display system (10) according to a fifth aspect, which may be implemented in conjunction with the first or fourth aspect, during the change processing, the display control unit (4) enhances strength of the sway correction as the angle of depression (θ1) decreases.

This aspect allows the sway of the virtual image (301) to be reduced irrespective of the magnitude of the angle of depression (θ1) by enhancing strength of the sway correction as the angle of depression (θ1) decreases. The reason is that as the angle of depression (θ1) decreases, the virtual image (301) is displayed more and more distant from the moving vehicle (100), thus making the relative positional shift between the virtual image (301) and the background (i.e., the target space 400) more and more noticeable for the user (200).

In a video display system (10) according to a sixth aspect, which may be implemented in conjunction with any one of the first to fifth aspects, the display unit (2), the projection unit (3), and the display control unit (4) are mounted in a moving vehicle (100), and the display control unit (4) performs the change processing in accordance with a velocity of the moving vehicle (100) as well.

This aspect allows the sway correction to be performed on the virtual image (301) in accordance with the velocity of the moving vehicle (100).

In a video display system (10) according to a seventh aspect, which may be implemented in conjunction with any one of the first to sixth aspects, the display unit (2), the projection unit (3), and the display control unit (4) are mounted in a moving vehicle (100). The video display system (10) further includes a detection unit (6). The detection unit (6) detects either road type information about a road along which the moving vehicle (100) is traveling or correspondence information corresponding to the road type information. The display control unit (4) restricts the projection distance (L1) in accordance with a result of detection by the detection unit (6).

This aspect allows the sway of the virtual image (301) to be reduced compared with a situation where the projection distance (L1) is not restricted.

In a video display system (10) according to an eighth aspect, which may be implemented in conjunction with the seventh aspect, the display control unit (4) restricts an upper limit value of the projection distance (L1) to a first limit value or an upper limit value of a variation range of the projection distance (L1) to a second limit value.

This aspect allows the sway of the virtual image (301) to be reduced compared with a situation where the projection distance (L1) is not restricted.

In a video display system (10) according to a ninth aspect, which may be implemented in conjunction with the seventh or eighth aspect, the display control unit (4) shortens, in accordance with the result of detection by the detection unit (6), the projection distance (L1) as magnitude of swaying motion of the moving vehicle (100) increases.

This aspect allows the sway of the virtual image (301) to be reduced compared with a situation where the projection distance (L1) is not shortened.

In a video display system (10) according to a tenth aspect, which may be implemented in conjunction with the seventh or eighth aspect, the display control unit (4) shortens the projection distance (L1) as magnitude of velocity variation of the moving vehicle (100) increases.

This aspect allows the sway of the virtual image (301) due to the velocity variation of the moving vehicle (100) to be reduced.

In a video display system (10) according to an eleventh aspect, which may be implemented in conjunction with any one of the first to tenth aspects, the display unit (2), the projection unit (3), and the display control unit (4) are mounted in a moving vehicle (100). The display control unit (4) changes the projection distance (L1) in accordance with moving vehicle information about the moving vehicle (100).

This aspect allows the projection distance (L1) to be changed in accordance with the moving vehicle information.

A moving vehicle (100) according to a twelfth aspect includes: the video display system (10) according to any one of the first to eleventh aspects; and a moving vehicle body (101) in which the video display system (10) is installed.

A moving vehicle (100) according to this aspect includes the video display system (10) described above, and therefore, is able to perform sway correction on the virtual image (301) according to the display mode.

A video display method according to a thirteenth aspect includes changing, in accordance with at least one of a projection distance (L1) or an angle of depression (θ1), specifics of sway correction for correcting sway of a virtual image (301) with respect to a target space (400). The projection distance (L1) is a distance from a viewpoint (P1)

of a user (200), who is viewing the virtual image (301) projected onto the target space (400) with outgoing light of a display unit (2), to the virtual image (301). The angle of depression (θ1) is an angle from which the virtual image (301) is viewed from the user's (200) viewpoint (P1).

This aspect allows the sway correction to be performed on the virtual image (301) according to the display mode, even without using any dedicated video display system (10).

A non-transitory storage medium according to a fourteenth aspect stores a program that is designed to make a computer system execute the video display method according to the thirteenth aspect.

This aspect allows the sway correction to be performed on the virtual image (301) according to the display mode, even without using any dedicated video display system (10).

Note that these aspects are only exemplary aspects of the present disclosure. Optionally, various configurations of the video display system (10) according to the exemplary embodiment and its variations described above are also implementable as, for example, a video display method, a (computer) program, or a non-transitory storage medium that stores the program thereon.

Note that the constituent elements according to the second to eleventh aspects are not essential elements of the video display system (10) but may be omitted as appropriate.

While various embodiments have been described herein above, it is to be appreciated that various changes in form and detail may be made without departing from the spirit and scope of the present disclosure presently or hereafter claimed.

The entire contents of Japanese Patent Application No. 2018-117661 mentioned above are incorporated by reference for all purposes.

The invention claimed is:

1. A video display system comprising:
a display configured to display an image thereon;
a projector configured to project a virtual image, corresponding to the image, onto a target space with outgoing light of the display; and
a display controller configured to:
perform change processing of changing, in accordance with at least one of a projection distance or an angle of depression, specifics of sway correction for correcting sway of the virtual image with respect to the target space, the projection distance being a distance from a viewpoint of a user, who is viewing the virtual image projected onto the target space, to the virtual image, the angle of depression being an angle from which the virtual image is viewed from the user's viewpoint, and
enhance, during the change processing, a strength of the sway correction as the projection distance increases.

2. The video display system of claim 1, wherein
the display controller is configured to, during the change processing,
perform the sway correction when the projection distance is equal to or longer than a predetermined distance and
perform no sway correction when the projection distance is shorter than the predetermined distance.

3. The video display system of claim 1, wherein
the display, the projector, and the display controller are mounted in a moving vehicle, and
the display controller is configured to perform the change processing in accordance with a velocity of the moving vehicle as well.

4. The video display system of claim 1, wherein
the display, the projector, and the display controller are mounted in a moving vehicle,
the video display system further comprises a detector configured to detect either road type information about a road along which the moving vehicle is traveling or correspondence information corresponding to the road type information, and
the display controller is configured to restrict the projection distance in accordance with a result of detection by the detector.

5. The video display system of claim 4, wherein
the display controller is configured to restrict an upper limit value of the projection distance to a first limit value or an upper limit value of a variation range of the projection distance to a second limit value.

6. The video display system of claim 4, wherein
the display controller is configured to shorten, in accordance with the result of detection by the detector, the projection distance as magnitude of swaying motion of the moving vehicle increases.

7. The video display system of claim 4, wherein
the display controller is configured to shorten the projection distance as a magnitude of a velocity variation of the moving vehicle increases.

8. The video display system of claim 1, wherein
the display, the projector, and the display controller are mounted in a moving vehicle, and
the display controller is configured to change the projection distance in accordance with moving vehicle information about the moving vehicle.

9. A moving vehicle comprising:
the video display system of claim 1; and
a moving vehicle body in which the video display system is installed.

10. A video display system comprising:
a display configured to display an image thereon;
a projector configured to project a virtual image, corresponding to the image, onto a target space with outgoing light of the display; and
a display controller configured to:
perform change processing of changing, in accordance with at least one of a projection distance or an angle of depression, specifics of sway correction for correcting sway of the virtual image with respect to the target space, the projection distance being a distance from a viewpoint of a user, who is viewing the virtual image projected onto the target space, to the virtual image, the angle of depression being an angle from which the virtual image is viewed from the user's viewpoint, and
enhance, during the change processing, a strength of the sway correction as the angle of depression decreases.

11. The video display system of claim 10, wherein
the display controller is configured to, during the change processing,
perform the sway correction when the angle of depression is equal to or smaller than a predetermined angle, and
perform no sway correction when the angle of depression is larger than the predetermined angle.

12. The video display system of claim 10, wherein
the display, the projector, and the display controller are mounted in a moving vehicle, and
the display controller is configured to perform the change processing in accordance with a velocity of the moving vehicle as well.

13. The video display system of claim 10, wherein
the display, the projector, and the display controller are mounted in a moving vehicle,
the video display system further comprises a detector configured to detect either road type information about a road along which the moving vehicle is traveling or correspondence information corresponding to the road type information, and
the display controller is configured to restrict the projection distance in accordance with a result of detection by the detector.

14. The video display system of claim 13, wherein
the display controller is configured to restrict an upper limit value of the projection distance to a first limit value or an upper limit value of a variation range of the projection distance to a second limit value.

15. The video display system of claim 13, wherein
the display controller is configured to shorten, in accordance with the result of detection by the detector, the projection distance as magnitude of swaying motion of the moving vehicle increases.

16. The video display system of claim 13, wherein
the display controller is configured to shorten the projection distance as a magnitude of a velocity variation of the moving vehicle increases.

17. The video display system of claim 10, wherein
the display, the projector, and the display controller are mounted in a moving vehicle, and
the display controller is configured to change the projection distance in accordance with moving vehicle information about the moving vehicle.

18. A moving vehicle comprising:
the video display system of claim 10; and
a moving vehicle body in which the video display system is installed.

19. A video display method comprising
changing, in accordance with at least one of a projection distance or an angle of depression, specifics of sway correction for correcting sway of a virtual image with respect to a target space, the projection distance being a distance from a viewpoint of a user, who is viewing the virtual image projected onto the target space with outgoing light of a display, to the virtual image, the angle of depression being an angle from which the virtual image is viewed from the user's viewpoint, and
enhancing, during the changing, a strength of the sway correction as the projection distance increases.

* * * * *